J. W. GRAY.
WOODWORKING MACHINE.
APPLICATION FILED MAR. 31, 1920.
1,358,148.
Patented Nov. 9, 1920.
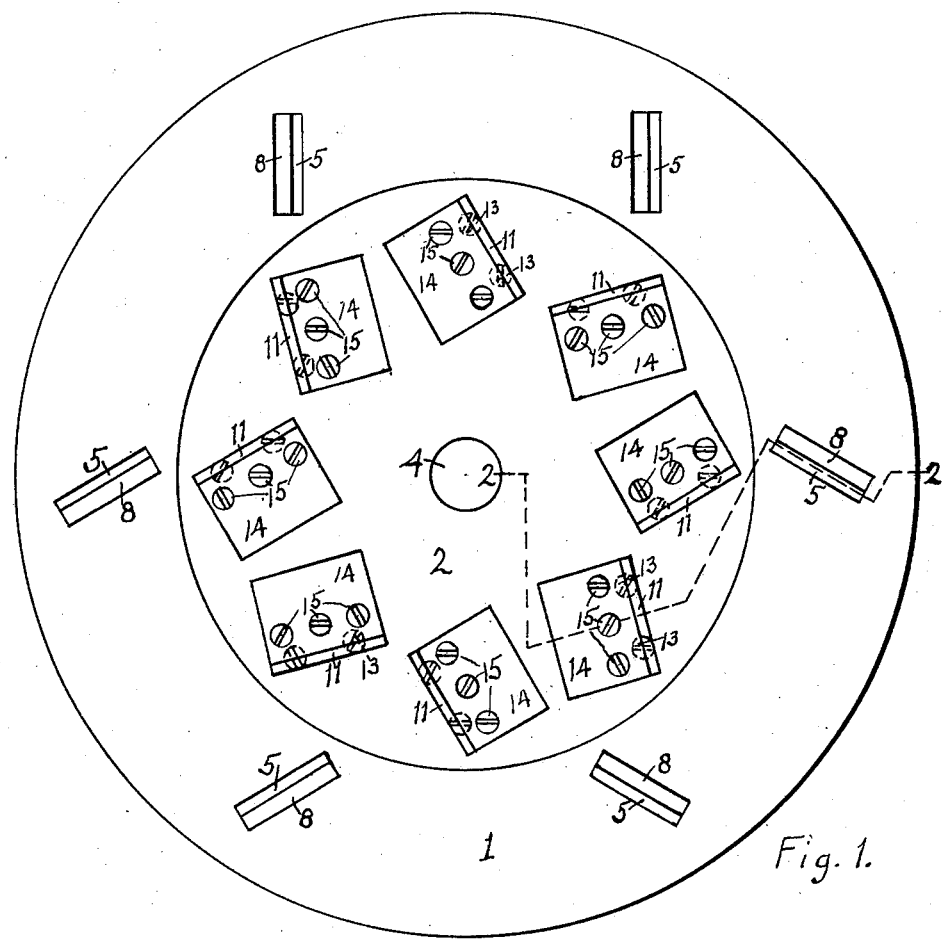
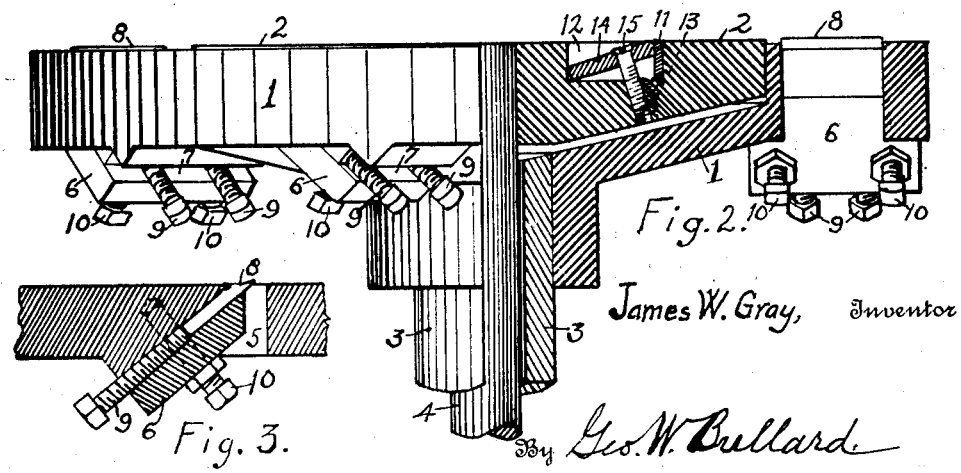
James W. Gray, Inventor
By Geo. W. Bullard
Attorney

UNITED STATES PATENT OFFICE.

JAMES W. GRAY, OF TACOMA, WASHINGTON.

WOODWORKING-MACHINE.

1,358,148.     Specification of Letters Patent.     Patented Nov. 9, 1920.

Application filed March 31, 1920. Serial No. 370,247.

*To all whom it may concern:*

Be it known that I, JAMES W. GRAY, of the city of Tacoma, in the county of Pierce and State of Washington, have invented new and useful Improvements in Woodworking-Machines, of which the following is a specification.

My invention relates to woodworking machines for finishing the flat surfaces of woods for all kinds of finished products. I have hereby added novel means for smoothly scraping the flat surfaces of finished woods, thereby greatly improving the woodworking machines set forth and described in my former Patent, No. 1,284,092, issued November 5, 1918. The object of my invention is to provide a more practical and effective means for obtaining a smoothly finished wood surface.

I attain this object by means of the mechanism illustrated in the accompanying drawing in which—Figure 1, is a face view of the machine showing the cutters and scrapers fixed therein: Fig. 2, is a side view of Fig. 1 with one half shown in section on the broken line 2—2 and Fig. 3 is a section through one of the cutters.

Similar numerals refer to similar parts in the several views.

My invention comprises an annular disk 1, surrounding a central disk or pressure plate 2, as shown in my former Patent No. 1,284,092, issued Nov. 5, 1918, and is to be operated as described therein. The outer or annular disk is mounted on a tubular shaft 3, inside of which is a solid shaft 4, on which is mounted the central pressure plate 2. The annular disk and pressure plate are mounted, adjusted and operated substantially the same as shown and described in my former Patent #1,284,092, issued Nov. 5, 1918. The annular disk 1, contains the slots 5, the clamping plates 6, the knife slots 7, and the cutting or planer knives 8, each adjusted by the screws 9 and firmly held by the screws 10, as shown and described in said patent. In my new improvement I have designed adjustable scrapers 11, to be used instead of files or rasps in the central pressure disk or plate 2. These scrapers 11, are set in rectangular receptacles or grooves made in the face of the pressure plate 2, The walls of each receptacle are made square with the face of the pressure plate, so that the scrapers 11, which are set in place will be at right angles with the face of said pressure plate 2, the back edge of scrapers 11 rests on two set screws 13, set in the body of plate 2. By means of the screws 13, each scraper 11, can be adjusted to conform to the face of the pressure plate 2, and thus scrape the face of the wood to a perfect smooth surface after the cutting or planing knives in the annular disk 1, have cut away the rough surface. The scrapers are securely held in place within the receptacles 12, by means of inclined clamping plates 14, with screws 15, and with its foot edge braced against the wall opposite the scraper blade 11, it holds the latter securely in position.

It will be observed that the receptacles 12, are so made that the scrapers 11, will set in pairs oppositely inclined with the radii of the pressure plate 2, the scrapers being thus oppositely inclined.

It will be further observed that the scrapers 11, are made of high-speed tool steel with a slight bevel on their scraping edges, so that the face sides of said scrapers 11, can be maintained in a shape condition.

I do not limit my invention to a fixed size or number of scrapers, but reserve the right to vary and use them as the size and character of the woodworking machines may require.

Having described my improvements I claim:

1. In a woodworking machine as described, the combination with a central disk or pressure plate, said pressure plate within an annular disk and so adjustably mounted as to rotate therewith, and said annular disk having a plurality of planer knives or cutters mounted therein, of a plurality of scrapers set in the face of said pressure plate, and said scrapers set in pairs oppositely inclined with the radii of said pressure plate to more effectively scrape and smooth the face of the wood surfaced by the said planer knives or cutters in the said annular disk as described and set forth.

2. In a woodworking machine as described, the combination with a central pressure plate, said pressure plate with an annular disk and so adjustably mounted as to rotate therewith, a plurality of planer knives or cutters mounted in said annular disk, of a plurality of scrapers set at right angles with the face of said pressure plates, said scrapers set in pairs oppositely inclined with the radii of said plate and by means of screws for adjusting and clamping said scrapers to coöperate with the planer knives or cutters in the said annular disk to perfectly scrape and smooth the face of the wood as described and set forth.

JAMES W. GRAY.